United States Patent
Tasan

(10) Patent No.: US 11,976,695 B2
(45) Date of Patent: May 7, 2024

(54) DRIVESHAFT WITH A BELLOW IN SPLINE ASSEMBLY

(71) Applicant: TIRSAN KARDAN SANAYI VE TICARET A.S., Manisa (TR)

(72) Inventor: Korkut Tasan, Manisa (TR)

( * ) Notice: Subject to any disclaimer, the term of this patent is extended or adjusted under 35 U.S.C. 154(b) by 427 days.

(21) Appl. No.: 17/434,630

(22) PCT Filed: Jun. 22, 2019

(86) PCT No.: PCT/TR2019/050491
§ 371 (c)(1),
(2) Date: Aug. 27, 2021

(87) PCT Pub. No.: WO2020/185175
PCT Pub. Date: Sep. 17, 2020

(65) Prior Publication Data
US 2022/0170514 A1    Jun. 2, 2022

(30) Foreign Application Priority Data

Mar. 9, 2019    (TR) ................................. 2019/03595

(51) Int. Cl.
*F16D 3/84* (2006.01)
*F16D 3/06* (2006.01)
*F16J 3/04* (2006.01)
*F16J 15/52* (2006.01)

(52) U.S. Cl.
CPC .............. *F16D 3/845* (2013.01); *F16D 3/06* (2013.01); *F16J 3/042* (2013.01); *F16J 15/52* (2013.01)

(58) Field of Classification Search
CPC .... F16D 3/845; F16D 3/06; F16J 3/042; F16J 15/52

USPC .......................... 464/173, 175, 178; 180/384
See application file for complete search history.

(56) References Cited

U.S. PATENT DOCUMENTS

| | | | | |
|---|---|---|---|---|
| 4,094,376 A | * | 6/1978 | Welschof | B60B 27/0005 464/175 |
| 4,195,718 A | * | 4/1980 | Schmohe | F16D 11/14 464/162 |
| 4,504,099 A | * | 3/1985 | Miki | B60B 35/14 464/178 |
| 4,764,153 A | * | 8/1988 | Jacob | F16C 33/60 464/178 |
| 5,961,388 A | | 10/1999 | Breidenbach et al. | |
| 11,118,631 B2 | * | 9/2021 | Poleti | F16D 3/845 |
| 2001/0016520 A1 | | 8/2001 | Sahashi et al. | |

FOREIGN PATENT DOCUMENTS

JP        2001241459 A        9/2001

OTHER PUBLICATIONS

PCT/TR2019/050491, "International Search Report and Written Opinion", dated Mar. 13, 2020, 6 pages.

* cited by examiner

*Primary Examiner* — Greg Binda
(74) *Attorney, Agent, or Firm* — Egbert, McDaniel & Swartz, PLLC

(57) ABSTRACT

A driveshaft has an elongated rotary slip sub, a tube sleeve telescopically engaged with the slip sub, a bearing assembly mounted on the slip sub by a roller, a retaining part positioned on the bearing assembly, and a cover extending radially outwardly of the slip sub. The roller is adjacent a movable end of the tube sleeve. A bellows is secured to an adjacent tube sleeve. The retaining part holds the bellows on the bearing assembly. The cover covers the roller.

10 Claims, 4 Drawing Sheets

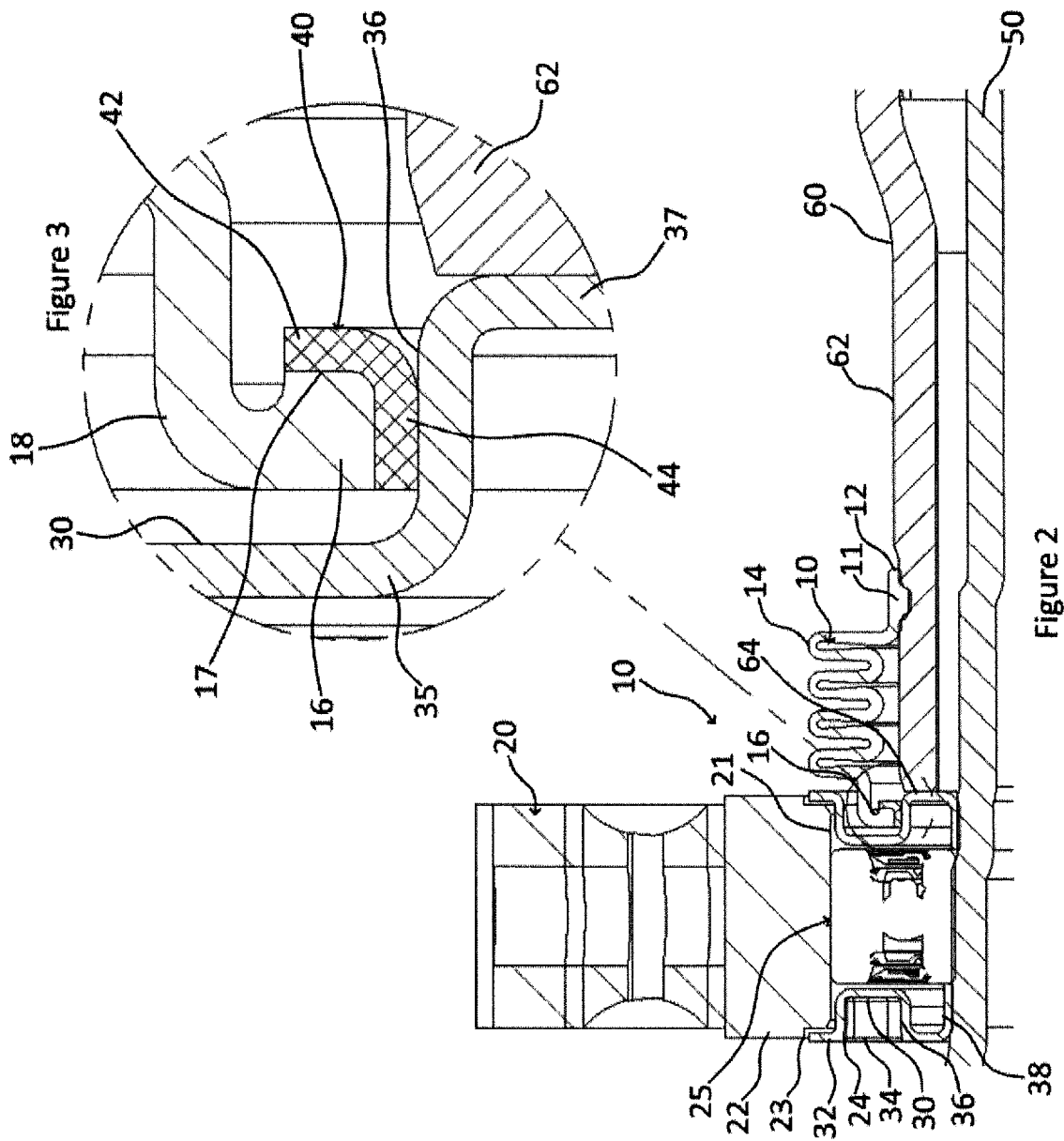

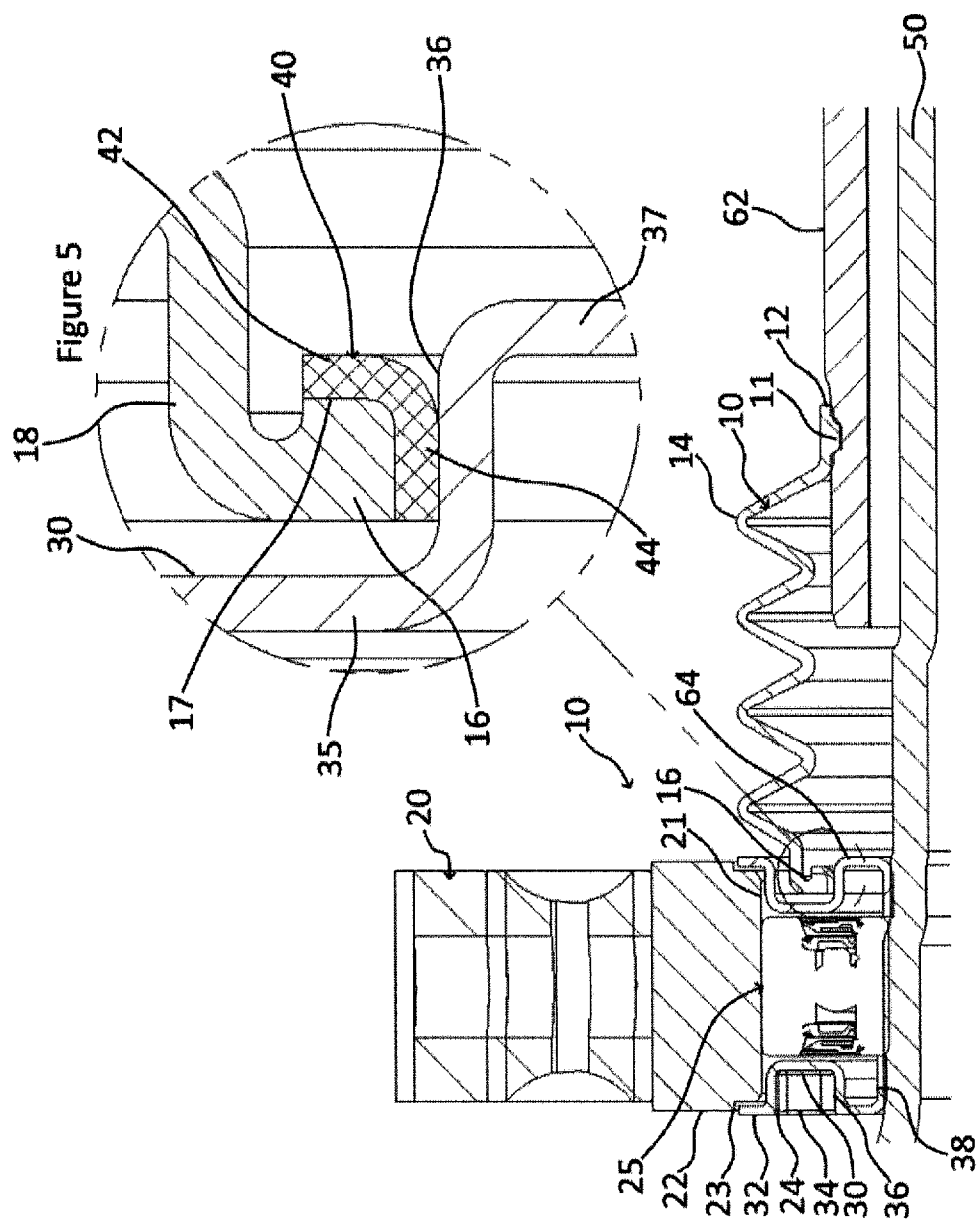

DRIVESHAFT WITH A BELLOW IN SPLINE ASSEMBLY

RELATED APPLICATIONS

This application is a U.S. National Phase of International Application No. PCT/TR2019/050491, filed Jun. 22, 2019, claiming priority to Turkish Patent Application No. 2019/03595, filed Mar. 9, 2019, contents of which are hereby incorporated by reference in their entirety.

TECHNICAL FIELD

The present invention relates to driveshafts provided with protective bellow on the movable parts.

PRIOR ART

In vehicles, transmission means are used to transmit rotational power from the engine or transmission assemblies to rotate one or more wheels. Driveshafts, as a commonly used drivetrain, include a central bearing and a yoke in addition to the universal joint and ensure a smooth transfer of driving force despite relative position changes between the front and rear parts of the vehicle. Due to the high torque transmitted, the driveshafts are designed to have high torsional stiffness and sufficient bending stiffness.

In the driveshaft between the front shaft and the rear shaft is situated hanger assembly. A bellow is mounted on the sliding shaft passing through the bearing assembly, at one end close to the bearing assembly. The bellow is mounted on the slip stub on the one hand to an outer periphery defining a bearing region near the bearing assembly of the sliding shaft. In the present construction a space for the bellow connection is reserved on the sliding shaft.

U.S. Pat. No. 5,961,388A patent publication shows a bellow assembly used in the driveshaft. A sliding yoke and narrowed diameter portion of the driveshaft is shown. In the convoluted bellow structure, a sealing element protects the splined connection between the sliding yoke and the narrowed diameter. The sliding yoke comprises a hollow cylindrical end portion and a yoke portion. A circumferential groove is formed on the outer surface of the sliding yoke tube end in the opposite direction to the yoke.

BRIEF DESCRIPTION OF THE INVENTION

The object of the invention is to shorten the bellow and slip stub length of the driveshaft with spline assembly.

In order to reach above objective, the invention relates to a driveshaft comprising an elongated rotary slip stub; a tube sleeve telescopically engaged to the slip stub; a bearing assembly mounted on the slip stub by means of a roller at a vicinity of a movable end of the tube sleeve and a bellow secured to the adjacent tube sleeve from a distal end such that surrounding an outer periphery. The driveshaft further comprises a retaining part which is provided on the bearing assembly and holding the bellow on the bearing assembly such that the bellow is secured directly to the bearing assembly from a proximal end. The retaining part secures the bellow to the bearing assembly, eliminating the need to reserve a further connection part on the shaft. The bearing assembly may be an spacer bearing assembly between the front shaft and the rear shaft of the driveshaft and which provides the mounting the driveshaft to a vehicle, or may also be in the form of a support element having another function which is attached to the shaft close to the movable end of the sleeve at any portion of the driveshaft with the slip stub and the tube sleeve. The bellow may be in the form of a resilient member of a monolithic or segmented structure made of a rubber or synthetic material.

In a preferred embodiment, a cover which is extending radially outwardly from the slip stub covering the roller and having a groove on which the retaining part is mounted. Thus, the cover not only protects the bearing against dust and similar ambient factors, but also allows the bellow to be mounted close to the bearing assembly at one end.

In a preferred embodiment, the cover is having S-shaped cross-section which forms the groove per se. The S-shape provides high structural strength that provides resistance to both axial stresses applied to the groove and radial vibrations from the shaft.

In a preferred embodiment, the retaining part is having a sleeve to engage in the groove from radially inwardly section. The sleeve makes it easy to mount the retaining part securely in the groove on the cover. Alternatively, additional sealing elements or an additional ring to the sleeve may ensure that the holding part is firmly received by the cavity.

In a preferred embodiment, a flange is extending radially outwardly from the sleeve and engaging the bearing assembly in a manner that presses the proximal end. The flange helps to hold the bellow in the cavity after the bellow is installed in the cavity, based on the corresponding end of the bellow from the interior with the fixing element.

In a preferred embodiment of the present invention, the proximal end is having an elbow section bent inwardly towards the flange. The elbow section allows the tubular bellow to be attached to the flange from the inside face. The elbow section can be used in a single piece or in a successive dual structure.

In a preferred embodiment, a cover housing securing the roller is provided on a support element at a vicinity of the roller and into which the cover is mounted. In this way, it is possible to install the cover in the gaps remaining on both sides of the bearing in the support element in which the bearing is located in the bearing assembly.

In a preferred embodiment, the movable end rests against a support wall of the cover in a closed position when the movable end of the tube sleeve is adjacent to the bearing assembly. The support wall stops the axial movement of the tube sleeve in the direction of the bearing assembly. The support wall can be directly integrated in the cover or can be attached to the bearing assembly as a separate part.

In a preferred embodiment, the travel distance is set equal to the stretching distance of the bellow in an open position when the movable end of the tube sleeve is spaced apart from the support wall. Thus, the axial movement of the sliding tool prevents the bellow from being damaged or tear apart.

In a preferred embodiment, the retaining part is made of at least partially by metal. The metal material provides a long-lasting solution against vibrations and other external factors to which the driveshaft will be exposed.

In a preferred embodiment of the invention, the bellow comprises an accordion shaped folding portion. The folding part is provided to be opened at the appropriate distance with the axial advances. With the folding part it is possible to use a compact bellow.

DESCRIPTION OF THE FIGURES

FIG. 2 is a partial cross-sectional illustration of a sliding assembly comprising a representative embodiment of the bellow assembly in a closed position.

FIG. 3 is an enlarged illustration of the bellow assembly shown in FIG. 2.

FIG. 4 is partial cross-sectional view of a sliding assembly having a bellows assembly in an opened position.

FIG. 5 is an enlarged view of the bellows assembly shows in FIG. 4.

DETAILED DESCRIPTION OF THE INVENTION

In this detailed description, the development according to the invention is explained in no way with any limitation and only with reference to the examples for better illustrating the subject matter.

Figure 1:
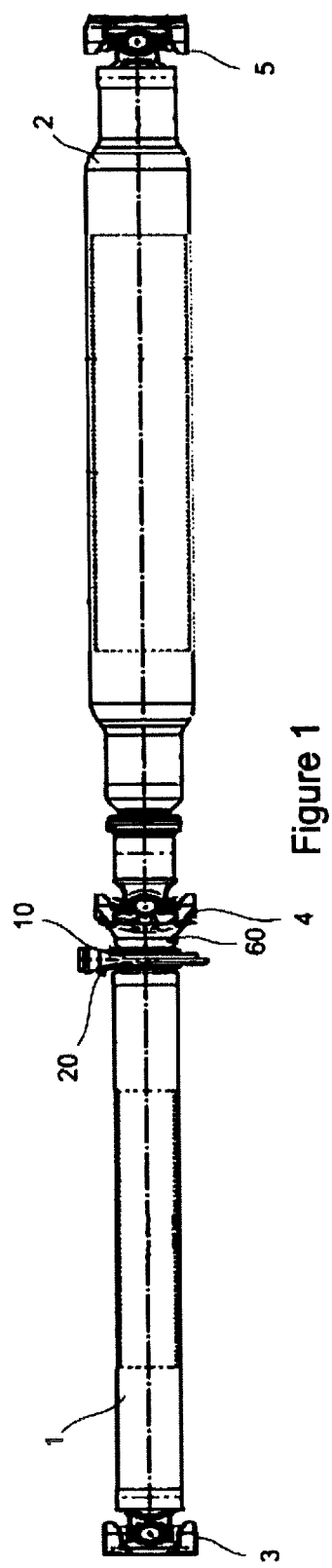
FIG. 1 is a front view of a two-piece driveshaft comprising the bellow assembly according to the invention.

FIG. 1 shows a two-part representative embodiment of the driveshaft according to the invention. The driveshaft comprises a rear shaft (2) with a rear joint (5) and a front shaft (1) with a rotary connection by means of a yoke (4). A front joint (3) is provided on the front shaft (1), which includes a coaxial coupling. From the gearbox of a vehicle (not shown), the torque applied to the drive train and the coupling assembly is transmitted therefrom via the driveshaft to the rear shaft (not shown) via the rear joint (5).

In FIG. 2, a sliding tool on the driveshaft is shown in partial section by being zoomed in on a bearing assembly (20). Above the bearing assembly (20), a roller (24) is supported in a bearing (25) in a radial cavity structure in the middle of a flat upright support element (22).

A slip stub (50) of the sliding tool coaxially passes with the roller (24) through the inner cavity of the roller (24). The bearing assembly (20) is suitably mounted from the top of a vehicle chassis base (not shown). A tube sleeve (60) is mounted on the slip stub (50) in an axially movable manner. A space is provided between the tube sleeve (60) and the slip stub (50) to allow movement. A bellow (10) is made of elastic material and is fixed between the tube sleeve 60 and the bearing assembly (20) at its opposite ends. The bellow (10) is attached to the bearing assembly (20) from a proximal end (16) of the tube sleeve (60) proximate the bearing assembly (20), at its opposite distal end (12) it is attached to a corresponding housing in an outer periphery (62) of the tube sleeve (60) by means of a connecting tab (11) in the form of a radially inwardly extending projection.

The bellow (10) have a folding part (14) of convoluted structure provided between the proximal end (16) and the distal end (12). The folding portion (14) is composed of a plurality of successive radial twisted portions of S-like cross-section close to each other in a folded position of the bellow (10). In the bearing (25) of the roller (24), a cover housing (21) is obtained with the distances left by the roller (24) from the edges.

The cover housing (21) is closed with a cover (30) that seals the lateral surfaces of the roller (24) in the channel (23) in such a way that the external dirt which will adversely affect the moving parts of the roller (24) does not reach the roller (24) or the bearing (25). The cover (30) is of a bent thin-walled plate structure and has an S-like cross-sectional form. Each cover housing (21) is closed by a cover (30), which is positioned in identical form but facing the opposite direction. The cover (30) is a S-shaped radial plate that is bent in the opposite S-shape on the outward-facing portion of the cover housing (21) in the portion facing the tube sleeve (60). The cover housing (21) securing the roller (24) is provided on a support element (22) adjacent the roller (24) and into which the cover (30) is mounted.

The cover (30) comprises a radially outwardly extending exterior edge (32) seated in a short channel (23) extending radially outwardly perpendicular to the bearing (25) on the outside of the support element (22). The cover (30) has a twisted portion at the lower end of the exterior edge (32) which forms a groove (34) which enters the bearing (25). The lower edge of the groove (34) forms a bearing wall (37) formed by a lower wall housing an interior (36) and a lower wall (38) in the opposite direction. The support wall (37) is vertically aligned with the outer edge of the support element (22). The bottom wall (38) sits on the slip stub (50) from the inner face surface.

Figure 6:
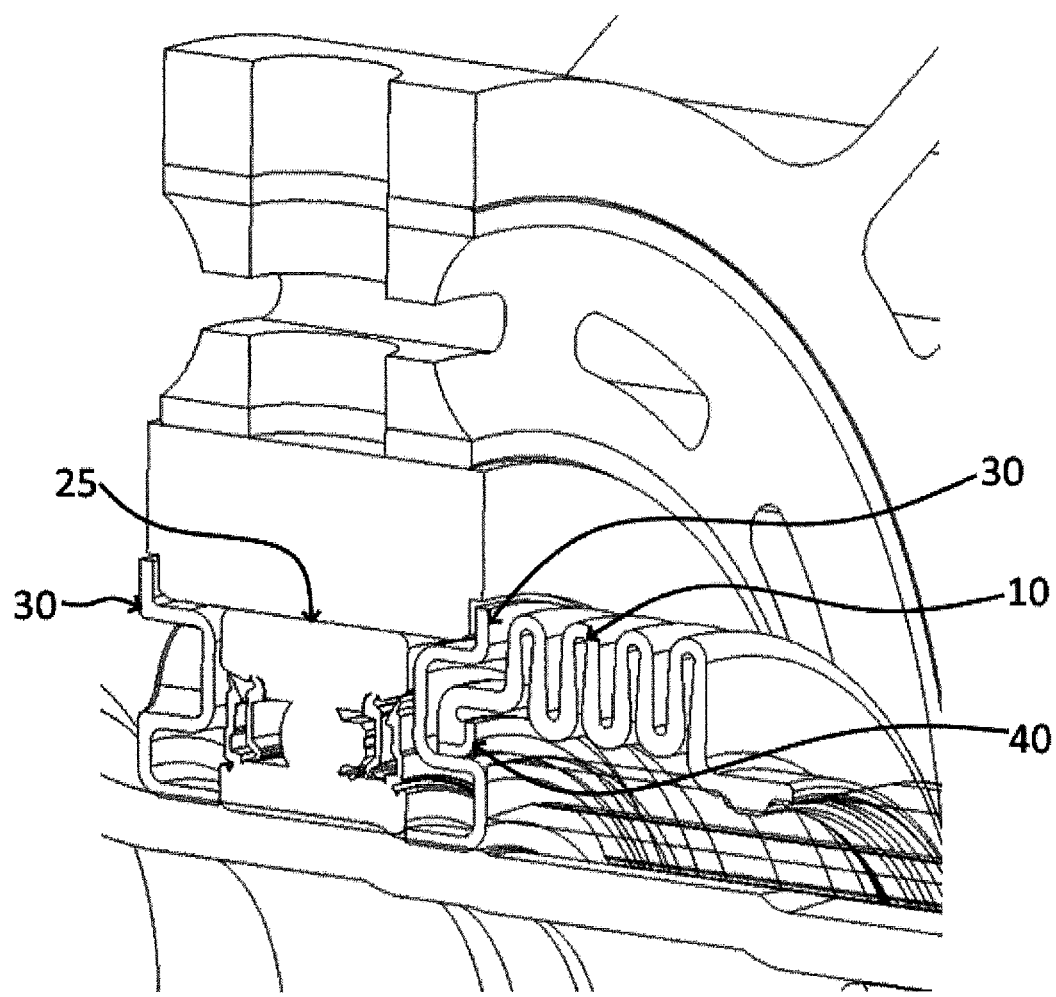
FIG. 6 is a partial cross-sectional view of the sliding assembly having the bellows assembly in a closed position.

In FIG. 3, the cover (30) is shown partially enlarged. Here, the retaining part (40) secured in the cover (30) is shown as having an L-like cross-sectional form. The retaining part (40), which is hidden in the forming part of the groove (34) of the cover (30), enables the bellow (10) to be secured to the cover (30) from its proximal end (16). At the proximal end (16) of the bellow (10), the bellow (10) are bent radially inward by an elbow section (18). Thus, an inwardly bent rear edge (17) is obtained. The rear edge (17) faces towards the hollow portion of the bellow (10). A form of flange (42) of the retaining part (40) rests against the rear edge (17) from the inside. On the other hand, a portion of the sleeve (44) connected to the flange (42) of the retaining part (40) fits into the interior part (36) by a tight fit. In the meantime, the bellow (10) reaches the closed position by leaning against the support wall (37) from the movable end (64) of the tube sleeve (60). In a preferred embodiment, the retaining part (40) is formed at least partially of metal. The closed position is shown in FIG. 2. The position where the retaining part is located is shown in FIG. 6.

During operation of the driveshaft, the tube sleeve (60) advances on the slip stub (50). In the meantime, the bellow (10) is opened from the folding part (14) and extends axially. During elongation, the proximal end (16) forms a tension on the flange (42) from its rear edge (17) in the direction of drawing. The flange (42) ensures that the proximal end (169 remains still in the groove (34). The flange (42) extends radially outwardly from the sleeve (44) and engages the bearing assembly (20) so as to press the proximal end (16). The connecting tab (11) communicates with the outer periphery (62) at the distal end (12) of the bellow (10). Thus, if the movable end (64) of the tube sleeve (60) moves away from the bearing assembly (20) and travels on the slip stub (50), the bellow (30) prevents the entrance of the peripheral foreign elements from the opening of the slide shaft (50) from the slide sleeve (60). When the tube sleeve (60) advances from the movable end (64) towards the cover (30), the movable end (64) rests against the support wall (37) of the cover (30) in a closed position when the movable end (64) of the tube sleeve (60) is adjacent to the bearing assembly (20). A travel distance is set that is equal to a stretching distance of the bellows (10) in an open position when the movable end (64) of the tube sleeve (60) is spaced from the support wall (37). The open position is shown in FIG. 4.

| REFERENCE NUMBERS | |
|---|---|
| 1 | Front Shaft |
| 2 | Rear Shaft |
| 3 | Front Joint |

-continued

| REFERANCE NUMBERS | |
|---|---|
| 4 | Yoke |
| 5 | Rear Joint |
| 10 | Bellow |
| 11 | Connecting Tab |
| 12 | Distal End |
| 14 | Folding Part |
| 16 | Proximal End |
| 17 | Rear Edge |
| 18 | Elbow section |
| 20 | Bearing assembly |
| 21 | Cover housing |
| 22 | Support Element |
| 23 | Channel |
| 24 | Roller |
| 25 | Bearing |
| 30 | Cover |
| 32 | Exterior Edge |
| 34 | Groove |
| 35 | Rear Wall |
| 36 | Interior Part |
| 37 | Support wall |
| 38 | Bottom Wall |
| 40 | Retaining part |
| 42 | Flange |
| 44 | Sleeve |
| 50 | Slip Stub |
| 60 | Tube Sleeve |
| 62 | Outer periphery |
| 64 | Movable End |

The invention claimed is:

1. A driveshaft comprising:
an elongated rotary slip sub;
a tube sleeve telescopically engaged with said elongated rotary slip sub;
a bearing assembly mounted on said elongated rotary slip sub by a roller adjacent a movable end of said tube sleeve and a bellows secured to an adjacent tube sleeve from a distal end of the bellows so as to surround an outer periphery of an adjacent tube sleeve;
a retaining part positioned on said bearing assembly so as to hold the bellows on said bearing assembly such that the bellows is secured directly to said bearing assembly from a proximal end of the bellows; and
a cover extending radially outwardly from said elongated rotary slip sub, said cover covering the roller, said cover having a groove upon which said retaining part is mounted.

2. The driveshaft of claim 1, wherein said cover has a S-shaped cross-section defining the groove.

3. The driveshaft of claim 1, wherein said retaining part has a sleeve engaging the groove from a radially inward section thereof.

4. The driveshaft of claim 1, wherein a flange extends radially outwardly from the sleeve of said retaining part so as to engage said bearing assembly and press the proximal end of the bellows.

5. The driveshaft of claim 1, wherein the proximal end has an elbow section bent inwardly toward the flange.

6. The driveshaft of claim 1, further comprising:
a cover housing securing the roller on a support element, said cover mounted into said cover housing.

7. The driveshaft of claim 1, wherein the movable end of said tube sleeve rests against a support wall of said cover in a closed position when the movable end of said tube sleeve is adjacent said bearing assembly.

8. The driveshaft of claim 7, wherein a travel distance is equal to a stretching distance of the bellows in an open position when the movable end of said tube sleeve is spaced from the support wall.

9. The driveshaft of claim 1, wherein said retaining part is formed at least partially of metal.

10. The driveshaft of claim 1, wherein the bellows has an accordion-shaped folding part.

* * * * *